US012431148B2

(12) United States Patent
Nagisetty et al.

(10) Patent No.: US 12,431,148 B2
(45) **Date of Patent: *Sep. 30, 2025**

(54) ENCODING DEVICE, DECODING DEVICE, ENCODING METHOD, DECODING METHOD, AND NON-TRANSITORY COMPUTER-READABLE RECORDING MEDIUM

(71) Applicant: Fraunhofer-Gesellschaft zur Foerderung der angewandten Forschung e.V., Munich (DE)

(72) Inventors: Srikanth Nagisetty, Singapore (SG); Zong Xian Liu, Singapore (SG); Hiroyuki Ehara, Kanagawa (JP)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 717 days.

This patent is subject to a terminal disclaimer.

(21) Appl. No.: 17/573,360

(22) Filed: Jan. 11, 2022

(65) Prior Publication Data

US 2022/0130402 A1 Apr. 28, 2022

Related U.S. Application Data

(63) Continuation of application No. 16/295,387, filed on Mar. 7, 2019, now Pat. No. 11,232,803, which is a (Continued)

(30) Foreign Application Priority Data

Jul. 29, 2014 (JP) ................................ 2014-153832

(51) Int. Cl.
*G10L 19/02* (2013.01)
*G10L 19/028* (2013.01)
(Continued)

(52) U.S. Cl.
CPC ........ *G10L 19/0208* (2013.01); *G10L 19/028* (2013.01); *G10L 19/035* (2013.01); *G10L 21/038* (2013.01)

(58) Field of Classification Search
CPC . G10L 19/0208; G10L 19/028; G10L 19/035; G10L 21/038; G10L 19/02; H03M 7/30
See application file for complete search history.

(56) References Cited

U.S. PATENT DOCUMENTS 5,657,422 A 8/1997 Janiszewski et al.
6,680,972 B1 1/2004 Liljeryd et al.
(Continued)

FOREIGN PATENT DOCUMENTS

AU 2014201331 A1 3/2014
CN 1296608 A 5/2001
(Continued)

OTHER PUBLICATIONS

G. Clark, S. Parker and S. Mitra, "A unified approach to time- and frequency-domain realization of FIR adaptive digital filters," in IEEE Transactions on Acoustics, Speech, and Signal Processing, vol. 31, No. 5, pp. 1073-1083, Oct. 1983.
(Continued)

*Primary Examiner* — Mark Villena
(74) *Attorney, Agent, or Firm* — Perkins Coie LLP; Michael A. Glenn

(57) ABSTRACT

An encoding device according to the disclosure includes a first encoder, which in operation, encodes a low-band signal from a voice or audio input signal to generate a first encoded signal; a decoder, which in operation, decodes the first encoded signal to generate a low-band decoded signal; a second encoder, which in operation, encodes, on the basis of the low-band decoded signal, a high-band signal comprising a band from the voice or audio input signal, the band being
(Continued)

higher than that of the low-band signal to generate a high-band encoded signal; an energy calculator, which in operation, calculates an energy of the voice or audio input signal for each subband of a plurality of subbands of the voice or audio input signal to acquire a calculated energy for each subband of the plurality of subbands of the voice or audio input signal, quantizes the calculated energy for each subband of the plurality of subbands of the voice or audio input signal to acquire a quantized band energy for each subband of the plurality of subbands of the voice or audio input signal and outputs the quantized band energy for each subband of the plurality of subbands of the voice or audio input signal; and a multiplexer, which in operation, multiplexes the quantized band energy for each subband of the plurality of subbands of the voice or audio input signal, the first encoded signal, and the high-band encoded signal to generate and output an encoded signal.

21 Claims, 10 Drawing Sheets

Related U.S. Application Data continuation of application No. 15/221,425, filed on Jul. 27, 2016, now Pat. No. 10,269,361, which is a continuation of application No. PCT/JP2015/001601, filed on Mar. 23, 2015.

(60) Provisional application No. 61/972,722, filed on Mar. 31, 2014.

(51) Int. Cl.
*G10L 19/035* (2013.01)
*G10L 21/038* (2013.01)

(56) References Cited

U.S. PATENT DOCUMENTS

| | | | |
|---|---|---|---|
| 6,928,406 B1 | 8/2005 | Ehara et al. | |
| 7,873,064 B1 | 1/2011 | Li et al. | |
| 8,560,329 B2 | 10/2013 | Zhang et al. | |
| 9,177,569 B2 | 11/2015 | Choo et al. | |
| 9,280,982 B1 | 3/2016 | Kushner | |
| 10,269,361 B2 | 4/2019 | Nagisetty et al. | |
| 2006/0271373 A1 | 11/2006 | Khalil et al. | |
| 2007/0206645 A1 | 9/2007 | Sundqvist et al. | |
| 2007/0239462 A1 | 10/2007 | Makinen et al. | |
| 2008/0027733 A1 | 1/2008 | Oshikiri et al. | |
| 2008/0049795 A1 | 2/2008 | Lakaniemi | |
| 2008/0147414 A1 | 6/2008 | Son et al. | |
| 2008/0294429 A1 | 11/2008 | Su et al. | |
| 2009/0024399 A1 | 1/2009 | Gartner et al. | |
| 2009/0157413 A1* | 6/2009 | Oshikiri | G10L 19/04 704/E21.017 |
| 2009/0319259 A1 | 12/2009 | Liljeryd et al. | |
| 2009/0326930 A1 | 12/2009 | Kawashima et al. | |
| 2009/0326931 A1 | 12/2009 | Ragot et al. | |
| 2010/0049511 A1 | 2/2010 | Ma et al. | |
| 2010/0280833 A1 | 11/2010 | Yamanashi et al. | |
| 2011/0035213 A1 | 2/2011 | Malenovsky et al. | |
| 2011/0046947 A1 | 2/2011 | Vaillancourt et al. | |
| 2011/0075832 A1 | 3/2011 | Tashiro | |
| 2011/0125505 A1 | 5/2011 | Vaillancourt et al. | |
| 2011/0196673 A1 | 8/2011 | Sharma et al. | |
| 2011/0250859 A1 | 10/2011 | Gu | |
| 2011/0307248 A1 | 12/2011 | Yamanashi et al. | |
| 2012/0065965 A1 | 3/2012 | Choo et al. | |
| 2012/0185256 A1 | 7/2012 | Virette et al. | |
| 2012/0209604 A1 | 8/2012 | Sehlstedt | |
| 2012/0271644 A1 | 10/2012 | Bessette et al. | |
| 2012/0288117 A1 | 11/2012 | Kim et al. | |
| 2013/0018660 A1 | 1/2013 | Qi et al. | |
| 2013/0101028 A1 | 4/2013 | Fukui et al. | |
| 2013/0117029 A1 | 5/2013 | Liu et al. | |
| 2013/0144632 A1 | 6/2013 | Sung | |
| 2013/0332177 A1 | 12/2013 | Helmrich et al. | |
| 2013/0339023 A1 | 12/2013 | Liljeryd et al. | |
| 2014/0149124 A1* | 5/2014 | Choo | G10L 21/038 704/500 |
| 2014/0188465 A1 | 7/2014 | Choo et al. | |
| 2014/0200901 A1* | 7/2014 | Kawashima | G10L 21/0388 704/500 |
| 2014/0257827 A1 | 9/2014 | Norvell et al. | |
| 2016/0111103 A1 | 4/2016 | Nagisetty et al. | |

FOREIGN PATENT DOCUMENTS

| | | | |
|---|---|---|---|
| CN | 1677492 | A | 10/2005 |
| CN | 1950686 | A | 4/2007 |
| CN | 101371295 | A | 2/2009 |
| CN | 101364854 | B | 1/2011 |
| CN | 102208188 | A | 10/2011 |
| CN | 102223152 | A | 10/2011 |
| CN | 102334159 | A | 1/2012 |
| CN | 102800317 | A | 11/2012 |
| CN | 103210443 | A | 7/2013 |
| CN | 103650038 | A | 3/2014 |
| CN | 105874534 | B | 6/2020 |
| EP | 0424016 | A2 | 4/1991 |
| EP | 0985328 | B1 | 3/2006 |
| EP | 1850327 | A1 | 10/2007 |
| EP | 1088302 | B1 | 7/2008 |
| EP | 2107556 | A1 | 10/2009 |
| FR | 2830970 | A1 | 4/2003 |
| JP | 2001521648 | A | 11/2001 |
| JP | 2008058727 | A | 3/2008 |
| JP | 2010020251 | A | 1/2010 |
| JP | 2011075728 | A | 4/2011 |
| JP | 2014153832 | A | 8/2014 |
| RU | 2441286 | C2 | 1/2012 |
| WO | 9847313 | A2 | 10/1998 |
| WO | 2000045379 | A3 | 12/2000 |
| WO | 2005096273 | A1 | 10/2005 |
| WO | 2005111568 | A1 | 11/2005 |
| WO | 2011042464 | A1 | 4/2011 |
| WO | 2011048094 | A1 | 4/2011 |
| WO | 2012005209 | A1 | 1/2012 |
| WO | 2012110415 | A1 | 8/2012 |
| WO | 2012110448 | A1 | 8/2012 |
| WO | 2013035257 | A1 | 3/2013 |
| WO | 2014096279 | A1 | 6/2014 |

OTHER PUBLICATIONS

PART 1—Henrique S. Malvar, Signal Processing with Lapped Transforms, Computer Science Engineering, 1992 , Chapter 5—198 pages. PART 2—Henrique S. Malvar, Signal Processing with Lapped Transforms, Computer Science Engineering, 1992, Chapter 5—181 pages.

ITU-T G.723.1—31 pagers.

J.D. Warren, et al., Analysis of the spectral envelope of sounds by the human brain, Neuroimage. Feb. 15, 2005;24(4):1052-7,, https://pubmed.ncbi.nlm.nih.gov/15670682/#:~: text=Spectral%20envelope%20is%20the%20shape,of%20sounds%20such%20as%20vowels—6 pages.

Part 1—Kondoz, Digital Speech: Coding for Low bit Rate Communication Systems (John Wiley & Sons 2004)—223 pages. Part 2 —Kondoz, Digital Speech: Coding for Low bit Rate Communication Systems (John Wiley & Sons 2004)—224 pages.

Lecomte et al., "An Improved Low Complexity AMR-WB+ Encoder using Neural Networks for Mode Selection" (AES 123rd Convention, New York, NY, USA, Oct. 5-8, 2007m Convention Paper 7294 section 2.1.2—11 pages.

Oh, H., et al., A Fast Quantization Loop Algorithm for MP3/AAC Encoders, AES 29th International Conference (2006)—5 pages.

Schnell et al., Proposed Core Experiment on AAC-ELD, Apr. 18, 2007—17 pages.

(56) References Cited

OTHER PUBLICATIONS

3GPP TR 26.952 V17.0.0 (Apr. 2022)—3rd Generation Partnership Project; Technical Specification Group Services and System Aspects; Codec for Enhanced Voice Services (EVS); Performance Characterization (Release 17)—176 pages.
3GPP TS 26.290 V2.0.0 (Sep. 2004)—3rd Generation Partnership Project; Technical Specification Group Service and System Aspects; Audio codec processing functions; Extended AMR Wideband codec; Transcoding functions (Release 6)—85 pages.
3GPP TS 26.442 V14.0.0 (Mar. 2017)—3rd Generation Partnership Project; Technical Specification Group Services and System Aspects; Codec for Enhanced Voice Services (EVS); ANSI C code (fixed-point) (Release 14)—10 pages.
3GPP TS 26.443 V14.0.0 (Mar. 2017)—3rd Generation Partnership Project; Technical Specification Group Services and System Aspects; Codec for Enhanced Voice Services (EVS); ANSI C code (floating-point) (Release 14)—10 pages.
3GPP TS 26.445 V12.0.0 (Sep. 2014)—3rd Generation Partnership Project; Technical Specification Group Services and System Aspects; Codec for Enhanced Voice Services (EVS); Detailed Algorithmic Description (Release 12)—640 pages.
3GPP TS 26.445 V14.0.0 (Mar. 2017)—3rd Generation Partnership Project; Technical Specification Group Services and System Aspects; Codec for Enhanced Voice Services (EVS); Detailed Algorithmic Description (Release 14)—674 pages.
3GPP TS 26.445 V14.2.0 (Dec. 2017)—3rd Generation Partnership Project; Technical Specification Group Services and System Aspects; Codec for Enhanced Voice Services (EVS); Detailed Algorithmic Description (Release 14)—675 pages.
3GPP TS 26.445 V16.2.0 (Dec. 2021)—3rd Generation Partnership Project; Technical Specification Group Services and System Aspects; Codec for Enhanced Voice Services (EVS); Detailed Algorithmic Description (Release 16)—676 pages.
3GPP TS 26.445 V17.0.0 (Apr. 2022)—3rd Generation Partnership Project; Technical Specification Group Services and System Aspects; Codec for Enhanced Voice Services (EVS); Detailed Algorithmic Description (Release 17)—676 pages.
3GPP TS 26.447 V14.0.0 (Mar. 2017)—3rd Generation Partnership Project; Technical Specification Group Services and System Aspects; Codec for Enhanced Voice Services (EVS); Error Concealment of Lost Packets (Release 14)—82 pages.
3GPP TS 26.447 V14.2.0 (Jun. 2020)—3rd Generation Partnership Project; Technical Specification Group Services and System Aspects; Codec for Enhanced Voice Services (EVS); Error Concealment of Lost Packets (Release 14)—83 pages.
3GPP TS 26.447 V16.0.0 (Mar. 2019)—3rd Generation Partnership Project; Technical Specification Group Services and System Aspects; Codec for Enhanced Voice Services (EVS); Error Concealment of Lost Packets (Release 16)—82 pages.
Convolution theorem—Wikipedia—7 pages.
ETSI TS 126 290 V6.1.0 (Dec. 2004)—Universal Mobile Telecommunications System (UMTS); Audio codec processing functions; Extended Adaptive Multi-Rate—Wideband (AMR-WB+) codec; Transcoding functions (3GPP TS 26.290 version 6.1.0 Release 6)—88 pages.
Fraunhofer IIS: Tdoc S4-130345, Qualification Deliverables for the Fraunhofer IIS Candidate for EVS (including Technical Description and Report on Compliance to Design Constraints), TSG SA4#72bis meeting, Mar. 11-15, 2013, San Diego, USA—8 pages.
Fuchs et al., MDCT-Based Coder for Highly Adaptive Speech and Audio Coding, 17th European Signal Processing Conference (EUSIPCO 2009), Glasgow, Scotland, Aug. 24-28, 2009—5 pages.
Huan Hou and Weibei Dou, Real-time Audio Error Concealment Method Based on Sinusoidal Model, International Conference on audio Language and Image Processing, IEEE, Jul. 2008, Shanghai, P.R. China, DOI: 10.1109/ICALIP.2008.4590009—8 pages.
ITU-T G.722 (Jul. 2003)—72 pages.
ITU-T G.722.2 (Jan. 2002) of the Telecommunication Standardization Sector of the International Telecommunication Union ("G.722.2"), Annex A—16 pages.
Marina Bosi and Richard E. Goldberg, Introduction To Digital Audio Coding And Standards, Springer 2003—442 pages.
Ostergaard, J., et al., Real-time perceptual moving-horizon multiple-description audio coding, IEEE Transactions on Signal Processing, 4286 (2011)—14 pages.
Ravishankar, C., Hughes Network Systems, Germantown, MD. Speech coding. United States, https://doi.org/10.2172/325392—144 pages.
Schnell et al., Low Delay Filter banks for Enhanced Low Delay Audio Coding, 2007 IEEE Workshop on Applications of Signal Processing to Audio and Acoustics Oct. 21, 2007—4 pages.
Virette, D., Low Delay Transform for High Quality Low Delay Audio Coding, Signal and Image Processing, (Université de Rennes 1, 2012), 40-41—197 pages.
ITU-T G.718 (Jun. 2008), Series G: Transmission Systems and Media, Digital Systems and Networks,, Frame error robust narrow-band and wideband embedded variable bit-rate coding of speech and audio from, 8-32 kbit/s Digital terminal equipments—Coding of voice and audio signals—257 pages.
3GPP TS 26.403 V6.0.0 (Sep. 2004)—3rd Generation Partnership Project; Technical Specification Group Services and System Aspects;, General audio codec audio processing functions; Enhanced aacPlus general audio codec; Encoder specification AAC part (Release 6)—23 pages.
3GPP TS 26.290 V10.0.0 (Mar. 2011)—3rd Generation Partnership Project; Technical Specification Group Services and System Aspects;, Audio codec processing functions. Extended Adaptive Multi-Rate-, Wideband (AMR-WB+) codec; Transcoding functions. (Release 10)—85 pages.

* cited by examiner

ENCODING DEVICE, DECODING DEVICE, ENCODING METHOD, DECODING METHOD, AND NON-TRANSITORY COMPUTER-READABLE RECORDING MEDIUM

CROSS-REFERENCES TO RELATED APPLICATIONS

This application is a continuation of copending U.S. patent application Ser. No. 16/295,387, filed on Mar. 7, 2019, which in turn is a continuation of U.S. patent application Ser. No. 15/221,425, filed on Jul. 27, 2016, which in turn is a continuation of International Application No. PCT/JP2015/001601, filed on Mar. 23, 2015, which is incorporated herein by reference in its entirety, and additionally claims priority from Japanese Application No. 2014-153832, filed on Jul. 29, 2014, and U.S. Application No. 61/972,722, filed on Mar. 31, 2014, all of which are incorporated herein by reference in their entirety.

BACKGROUND OF THE INVENTION

The present disclosure relates to a device that encodes a voice signal and an audio signal (hereinafter referred to as a voice signal and the like) and a device that decodes the voice signal and the like.

A voice encoding technology that compresses the voice signal and the like at a low bit rate is an important technology that realizes efficient use of radio waves and the like in mobile communication. In addition, expectations for a higher quality telephone voice have been raised in recent years, and a telephone service with enhanced realistic sensation has been desired. In order to realize this, it is sufficient that the voice signal and the like having a wide frequency band is encoded at a high bit rate. However, this approach contradicts efficient use of radio waves or frequency bands.

As a method that encodes a signal having a wide frequency band at high quality at a low bit rate, there is a technique that reduces the overall bit rate by dividing a spectrum of an input signal into two spectra of a low-band part and a high-band part, and by replicating a low-band spectrum and transposing a high-band spectrum with the replicated low-band spectrum, that is, by substituting the low-band spectrum for the high-band spectrum (Japanese Unexamined Patent Application Publication (Translation of PCT Application) No. 2001-521648). In this technique, encoding is performed by allocating a reduced number of bits by performing the following process as a basic process: encoding a low-band spectrum at high quality by allocating a large number of bits and replicating the encoded low-band spectrum as a high-band spectrum.

If the technique disclosed in Japanese Unexamined Patent Application Publication (Translation of PCT Application) No. 2001-521648 is used without any modification, a signal having a strong peak feature seen in the low-band spectrum is replicated as is to the high band. Thus, noise that sounds like a ringing bell is generated, reducing subjective quality. Accordingly, there is a technique that uses a low-band spectrum with an appropriately adjusted dynamic range, as a high-band spectrum (International Publication No. 2005/111568).

In the technique disclosed in International Publication No. 2005/111568, the dynamic range is defined by taking into account all components making up the low-band spectrum. However, the spectrum of a voice signal and the like includes a component having a strong peak feature, i.e., a component having a large amplitude (tonal component), and a component having a weak peak feature, i.e., a component having a small amplitude (non-tonal component). The technique disclosed in International Publication No. 2005/111568 makes evaluation by taking into account all components including both of the above components and therefore does not always produce the best result.

SUMMARY

According to an embodiment, an encoding device may comprise: a first encoder, which in operation, encodes a low-band signal from a voice or audio input signal to generate a first encoded signal; a decoder, which in operation, decodes the first encoded signal to generate a low-band decoded signal; a second encoder, which in operation, encodes, on the basis of the low-band decoded signal, a high-band signal comprising a band from the voice or audio input signal, the band being higher than that of the low-band signal to generate a high-band encoded signal; an energy calculator, which in operation, calculates an energy of the voice or audio input signal for each subband of a plurality of subbands of the voice or audio input signal to acquire a calculated energy for each subband of the plurality of subbands of the voice or audio input signal, quantizes the calculated energy for each subband of the plurality of subbands of the voice or audio input signal to acquire a quantized band energy for each subband of the plurality of subbands of the voice or audio input signal and outputs the quantized band energy for each subband of the plurality of subbands of the voice or audio input signal; and a multiplexer, which in operation, multiplexes the quantized band energy for each subband of the plurality of subbands of the voice or audio input signal, the first encoded signal, and the high-band encoded signal to generate and output an encoded signal.

Another embodiment may have a decoding device that receives a first encoded signal, a high-band encoded signal comprising lag information, and a band energy encoded signal representing a quantized band energy for each subband of a plurality of subbands, the decoding device comprising: a first decoder, which in operation, decodes the first encoded signal to generate a low-band decoded signal; a second decoder, which in operation, decodes the high-band encoded signal to generate a wide-band decoded signal by using the low-band decoded signal and the band energy encoded signal representing a quantized band energy for each subband of a plurality of subbands; and a third decoder, which in operation, decodes the band energy encoded signal to generate a quantized band energy for each subband of the plurality of subbands.

According to another embodiment, an encoding method comprises: encoding a low-band signal from a voice or audio input signal to generate a first encoded signal; decoding the first encoded signal to generate a low-band decoded signal; encoding, on the basis of the low-band decoded signal, a high-band signal comprising a band higher than that of the low-band signal to generate a high-band encoded signal; calculating an energy of the voice or audio input signal for each subband of a plurality of subbands of the voice or audio input signal to acquire a calculated energy for each subband of the plurality of subbands of the voice or audio input signal, quantizing the calculated energy for each subband of the plurality of subbands of the voice or audio input signal to acquire a quantized band energy for each subband of the plurality of subbands of the voice or audio input signal, and outputting the quantized band energy for each subband of the plurality of subbands of the voice or audio input signal; and multiplexing the quantized band energy for each subband of the plurality of subbands of the voice or audio input signal, the first encoded signal and the high-band encoded signal to generate and output an encoded signal.

Another embodiment may have a decoding method for a first encoded signal, a high-band encoded signal comprising lag information, and a band energy encoded signal representing a quantized band energy for each subband of a plurality of subbands, the method comprising: decoding the first encoded signal to generate a low-band decoded signal; decoding the high-band encoded signal to generate a wide-band decoded signal by using the low-band decoded signal and the band energy encoded signal representing a quantized band energy for each subband of a plurality of subbands; and decoding the band energy encoded signal to generate a quantized band energy for each subband of the plurality of subbands.

Another embodiment may have a non-transitory digital storage medium having a computer program stored thereon to perform the encoding method comprising: encoding a low-band signal from a voice or audio input signal to generate a first encoded signal; decoding the first encoded signal to generate a low-band decoded signal; encoding, on the basis of the low-band decoded signal, a high-band signal comprising a band higher than that of the low-band signal to generate a high-band encoded signal; calculating an energy of the voice or audio input signal for each subband of a plurality of subbands of the voice or audio input signal to acquire a calculated energy for each subband of the plurality of subbands of the voice or audio input signal, quantizing the calculated energy for each subband of the plurality of subbands of the voice or audio input signal to acquire a quantized band energy for each subband of the plurality of subbands of the voice or audio input signal, and outputting the quantized band energy for each subband of the plurality of subbands of the voice or audio input signal; and multiplexing the quantized band energy for each subband of the plurality of subbands of the voice or audio input signal, the first encoded signal and the high-band encoded signal to generate and output an encoded signal, when said computer program is run by a computer.

Another embodiment may have a non-transitory digital storage medium having a computer program stored thereon to perform the decoding method for a first encoded signal, a high-band encoded signal comprising lag information, and a band energy encoded signal representing a quantized band energy for each subband of a plurality of subbands, the method comprising: decoding the first encoded signal to generate a low-band decoded signal; decoding the high-band encoded signal to generate a wide-band decoded signal by using the low-band decoded signal and the band energy encoded signal representing a quantized band energy for each subband of a plurality of subbands; and decoding the band energy encoded signal to generate a quantized band energy for each subband of the plurality of subbands, when said computer program is run by a computer.

One non-limiting and exemplary embodiment provides a device that enables encoding of a voice signal and the like with higher quality by separating and using a tonal component and a non-tonal component individually for encoding while reducing an overall bit rate, and a device that enables decoding of the voice signal and the like.

In one general aspect, the techniques disclosed here feature an encoding device employing such a configuration that includes a first encoding unit that encodes a low-band signal having a frequency lower than or equal to a predetermined frequency from a voice or audio input signal to generate a first encoded signal, and decodes the first encoded signal to generate a low-band decoded signal; a second encoding unit that encodes, on the basis of the low-band decoded signal, a high-band signal having a band higher than that of the low-band signal to generate a high-band encoded signal; and a first multiplexing unit that multiplexes the first encoded signal and the high-band encoded signal to generate and output an encoded signal. The second encoding unit calculates an energy ratio between a high-band noise component, which is a noise component of the high-band signal, and a high-band non-tonal component of a high-band decoded signal generated from the low-band decoded signal and outputs the calculated ratio as the high-band encoded signal.

It is possible to encode and decode a voice signal and the like at higher quality by using an encoding device and a decoding device in an embodiment of the present disclosure.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the present invention will be detailed subsequently referring to the appended drawings, in which.

DETAILED DESCRIPTION OF THE INVENTION

Configurations and operations in embodiments of the present disclosure will be described below with reference to the drawings. Note that an input signal that is input to an encoding device according to the present disclosure and an output signal that is output from a decoding device according to the present disclosure include, in addition to the case of only voice signals in a narrow sense, the case of audio signals having wider bandwidths and the case where these signals coexist.

Figure 1:
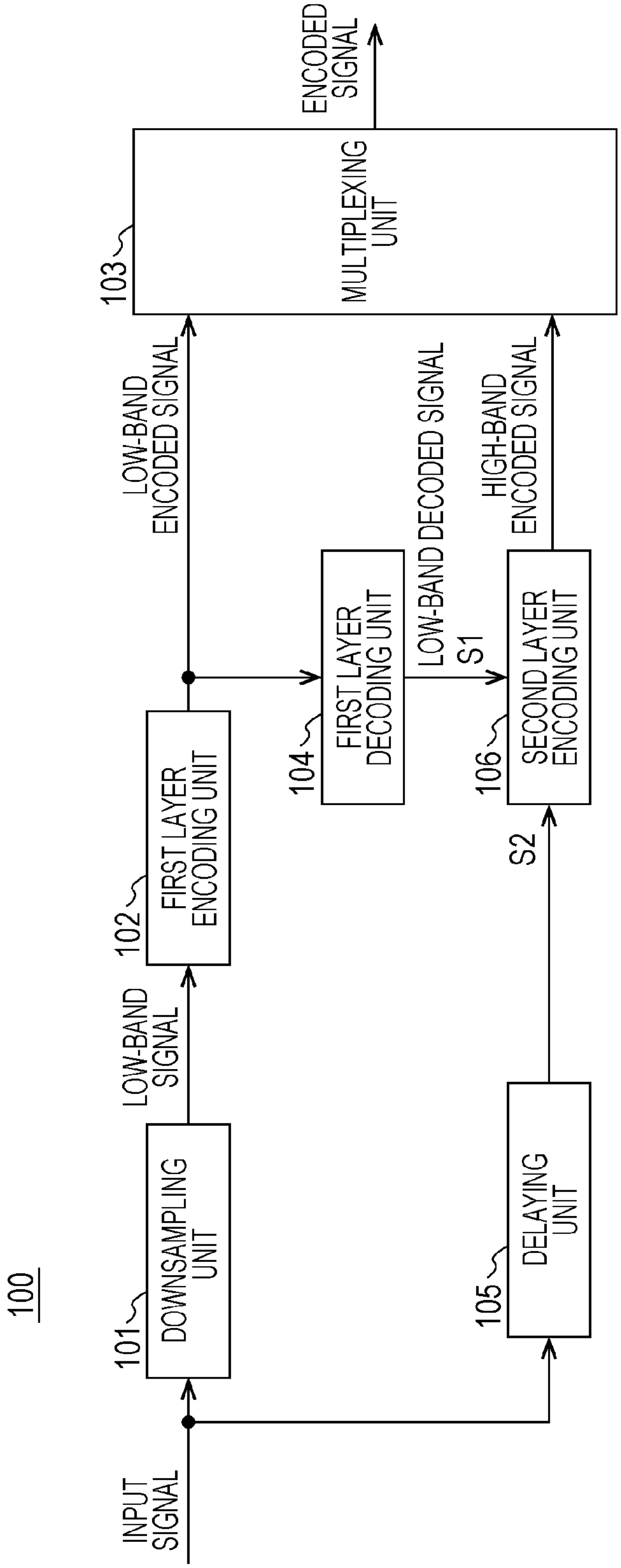
FIG. 1 illustrates an overall configuration of an encoding device according to the present disclosure.

FIG. 1 is a block diagram illustrating a configuration of an encoding device for a voice signal and the like according to a first embodiment. An exemplary case will be described in which an encoded signal has a layered configuration including a plurality of layers; that is, a case of performing hierarchical coding (scalable encoding) will be described. An example that encompasses encoding other than scalable encoding will be described later with reference to FIG. 4. An encoder 100 illustrated in FIG. 1 includes a downsampling unit 101, a first layer encoding unit 102, a multiplexing unit 103, a first layer decoding unit 104, a delaying unit 105, and a second layer encoding unit 106. In addition, an antenna, which is not illustrated, is connected to the multiplexing unit 103.

The downsampling unit 101 generates a signal having a low sampling rate from an input signal and outputs the generated signal to the first layer encoding unit 102 as a low-band signal having a frequency lower than or equal to a predetermined frequency.

The first layer encoding unit 102, which is an embodiment of a component of a first encoding unit, encodes the low-band signal. Examples of encoding include CELP (code excited linear prediction) encoding and transform encoding. The encoded low-band signal is output to the first layer decoding unit 104 and the multiplexing unit 103 as a low-band encoded signal, which is a first encoded signal.

The first layer decoding unit 104, which is also an embodiment of a component of the first encoding unit, decodes the low-band encoded signal, thereby generating a low-band decoded signal S1. Then, the first layer decoding unit 104 outputs the low-band decoded signal S1 to the second layer encoding unit 106.

On the other hand, the delaying unit 105 delays the input signal for a predetermined period. This delay period is used to correct a time delay generated in the downsampling unit 101, the first layer encoding unit 102, and the first layer decoding unit 104. The delaying unit 105 outputs a delayed input signal S2 to the second layer encoding unit 106.

On the basis of the low-band decoded signal S1 generated by the first layer decoding unit 104, the second layer encoding unit 106, which is an embodiment of a second encoding unit, encodes a high-band signal having a frequency higher than the predetermined frequency from the input signal S2, thereby generating a high-band encoded signal. The low-band decoded signal S1 and the input signal S2 are input to the second layer encoding unit 106 after having been subjected to frequency transformation, such as MDCT (modified discrete cosine transform). Then, the second layer encoding unit 106 outputs the high-band encoded signal to the multiplexing unit 103. Details of the second layer encoding unit 106 will be described later.

The multiplexing unit 103 multiplexes the low-band encoded signal and the high-band encoded signal, thereby generating an encoded signal, and transmits the encoded signal to a decoding device through the antenna, which is not illustrated.

Figure 2:
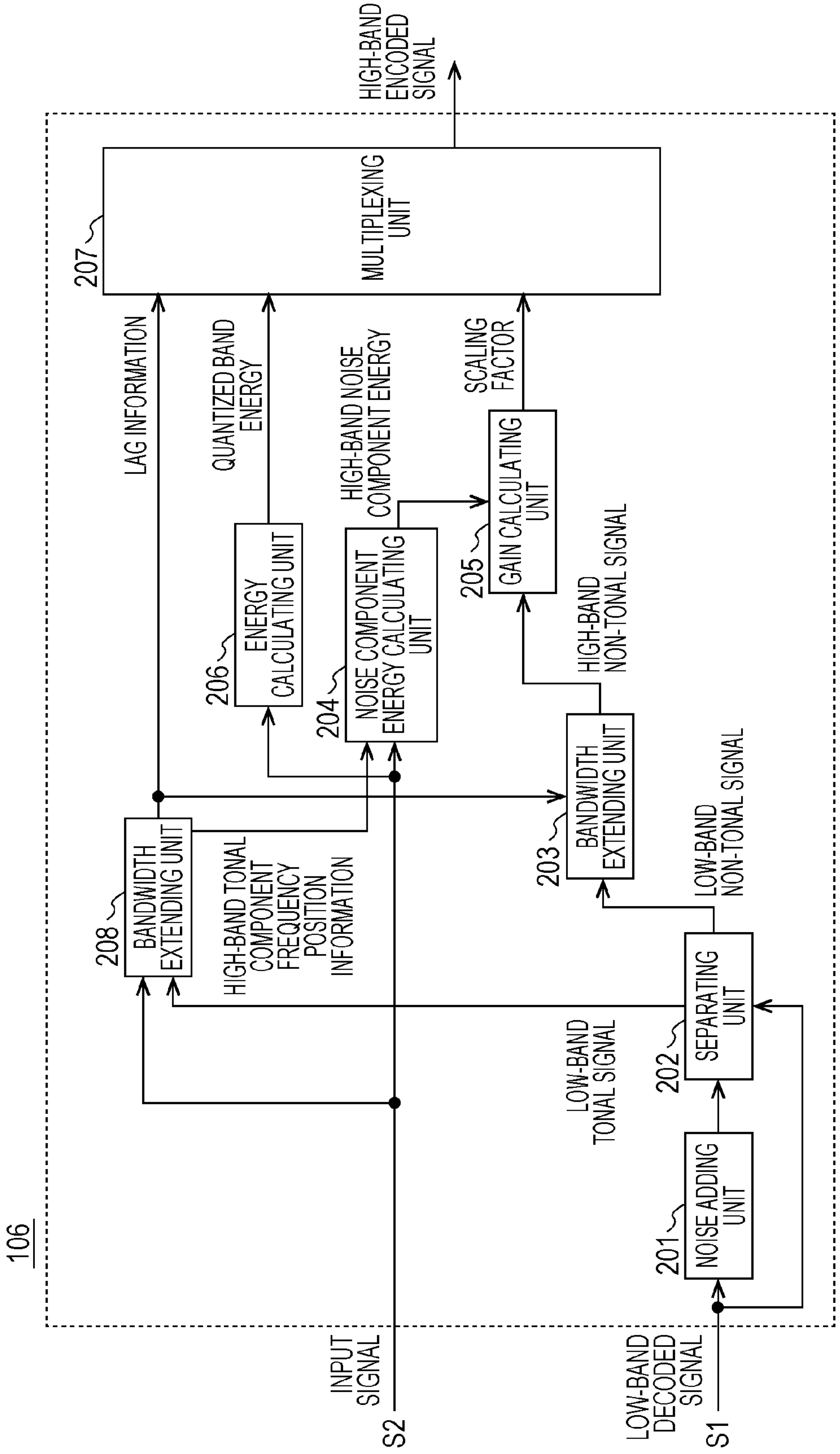
FIG. 2 illustrates a configuration of a second layer encoding unit in an encoding device according to a first embodiment of the present disclosure.

FIG. 2 is a block diagram illustrating a configuration of the second layer encoding unit 106 in this embodiment. The second layer encoding unit 106 includes a noise adding unit 201, a separating unit 202, a bandwidth extending unit 203, a noise component energy calculating unit 204 (first calculating unit), a gain calculating unit 205 (second calculating unit), an energy calculating unit 206, a multiplexing unit 207, and a bandwidth extending unit 208.

The noise adding unit 201 adds a noise signal to the low-band decoded signal S1, which has been input from the first layer decoding unit 104. Note that the term "noise signal" refers to a signal having random characteristics and is, for example, a signal having a signal intensity amplitude that fluctuates irregularly with respect to the time axis or the frequency axis. The noise signal may be generated as needed on the basis of random numbers. Alternatively, a noise signal (e.g., white noise, Gaussian noise, or pink noise) that is generated in advance may be stored in a storing device, such as a memory, and may be called up and output. In addition, the noise signal is not limited to a single signal, and one of a plurality of noise signals may be selected and output in accordance with predetermined conditions.

To encode an input signal, if the number of bits that can be allocated is small, only some of frequency components can be quantized, which results in degradation in subjective quality. However, by adding a noise signal by using the noise adding unit 201, noise signals compensate for components that would be zero by not being quantized, and thus, an effect of relieving the degradation can be expected.

Note that the noise adding unit 201 has an arbitrary configuration. Then, the noise adding unit 201 outputs, to the separating unit 202, a low-band decoded signal to which the noise signal has been added.

From the low-band decoded signal, to which the noise signal has been added, the separating unit 202 separates a low-band non-tonal signal, which is a non-tonal component, and a low-band tonal signal, which is a tonal component. Here, the term "tonal component" refers to a component having an amplitude greater than a predetermined threshold or a component that has been quantized by a pulse quantizer. In addition, the term "non-tonal component" refers to a component having an amplitude less than or equal to the predetermined threshold or a component that has become zero by not having been quantized by a pulse quantizer.

In the case of distinguishing the tonal component and the non-tonal component from each other by using the predetermined threshold, separation is performed depending on whether or not the amplitude of a component of the low-band decoded signal is greater than the predetermined threshold. In the case of distinguishing the tonal component and the non-tonal component from each other depending on whether or not a component has been quantized by a pulse quantizer, since this case corresponds to the case where the threshold value is zero, the low-band tonal signal can be generated by subtracting the low-band decoded signal S1 from the low-band decoded signal to which the noise signal has been added by the noise adding unit 201.

Then, the separating unit 202 outputs the low-band non-tonal signal to the bandwidth extending unit 203 and outputs the low-band tonal signal to the bandwidth extending unit 208.

The bandwidth extending unit 208 searches for a specific band of the low-band tonal signal in which the correlation between the high-band signal from the input signal S2 and a low-band tonal signal generated for bandwidth extension becomes maximum. The search may be performed by selecting a candidate in which the correlation becomes maximum from among specific candidate positions that have been prepared in advance. As the low-band tonal signal generated for bandwidth extension, the low-band tonal signal that has been separated (quantized) by the separating unit 202 may be used without any processing, or a smoothed or normalized tonal signal may be used.

Then, the bandwidth extending unit 208 outputs, to the multiplexing unit 207 and the bandwidth extending unit 203, information that specifies the position of the searched specific band, in other words, lag information that specifies the position (frequency) of a low-band spectrum used to generate extended bandwidths. Note that the lag information does not have to include all information corresponding to all the extended bandwidths, and only some information corresponding to some of the extended bandwidths may be transmitted. For example, the lag information may be encoded for some sub-bands to be generated by bandwidth extension; and encoding may not be performed for the rest of the sub-bands, and sub-bands may be generated by aliasing a spectrum generated by using the lag information on the decoder side.

The bandwidth extending unit 208 selects a component having a large amplitude from the high-band signal from the input signal S2 and calculates the correlation by using only the selected component, thereby reducing the calculation amount for correlation calculation, and outputs, to the noise component energy calculating unit 204 (first calculating unit), the frequency position information of the selected component as high-band tonal-component frequency position information.

On the basis of the position of the specific band specified by the lag information, the bandwidth extending unit 203 extracts the low-band non-tonal signal, sets the low-band non-tonal signal as a high-band non-tonal signal, and outputs the high-band non-tonal signal to the gain calculating unit 205.

By using the high-band tonal-component frequency position information, the noise component energy calculating unit 204 calculates the energy of a high-band noise component, which is a noise component of the high-band signal from the input signal S2, and outputs the energy to the gain calculating unit 205. Specifically, by subtracting the energy of the component of the spectral bins at the high-band tonal-component frequency positions in the high-band part from the energy of the components in the entire high-band part of the input signal S2, the energy of components other than the high-band tonal component is obtained, and this energy is output to the gain calculating unit 205 as high-band noise component energy.

The gain calculating unit 205 calculates the energy of the high-band non-tonal signal output from the bandwidth extending unit 203, calculates the ratio between this energy and the energy of the high-band noise component output from the noise component energy calculating unit 204, and outputs this ratio to the multiplexing unit 207 as a scaling factor.

The energy calculating unit 206 calculates the energy of the input signal S2 for each sub-band. For example, the energy can by calculated from the sum of squares of spectra in sub-bands obtained by dividing the input signal S2 into sub-bands. For example, the energy can be defined by the following expression.

$$E_M(b) = \log_2\left(\sum_{k=k_{start(b)}}^{k=k_{end}(b)} X_M(k)^2 + \text{Epsilon}\right),\ b = 0, \ldots, N_{bands} - 1$$

In the expression, X is an MDCT coefficient, b is a sub-band number, and Epsilon is a constant for scalar quantization.

Then, the energy calculating unit 206 outputs an index representing the degree of the obtained quantized band energy to the multiplexing unit 207 as quantized band energy.

The multiplexing unit 207 encodes and multiplexes the lag information, the scaling factor, and the quantized band energy. Then, a signal obtained by multiplexing is output as a high-band encoded signal. Note that the multiplexing unit 207 and the multiplexing unit 103 may be provided separately or integrally.

In the above manner, in this embodiment, the gain calculating unit 205 (second calculating unit) calculates the ratio between the energy of the high-band non-tonal (noise) component of the high-band signal from the input signal and the energy of the high-band non-tonal (noise) signal from in a high-band decoded signal generated from the low-band decoded signal. Accordingly, this embodiment produces an effect of enabling more accurate reproduction of the energy of a non-tonal (noise) component of a decoded signal.

That is, it is possible to more accurately reproduce the energy of the non-tonal component, which is smaller than that of the tonal component and tends to include errors, and the energy of the non-tonal component of the decoded signal is stabilized. In addition, it is also possible to more accurately reproduce the energy of the tonal component calculated by using the band energy and the energy of the non-tonal component. Furthermore, it is possible to perform encoding by using a small number of bits to generate the high-band encoded signal.

Next, a configuration of an encoding device according to a second embodiment of the present disclosure will be described with reference to FIG. 3. Note that the overall configuration of an encoding device 100 according to this embodiment has the configuration illustrated in FIG. 1, as in the first embodiment.

Figure 3:
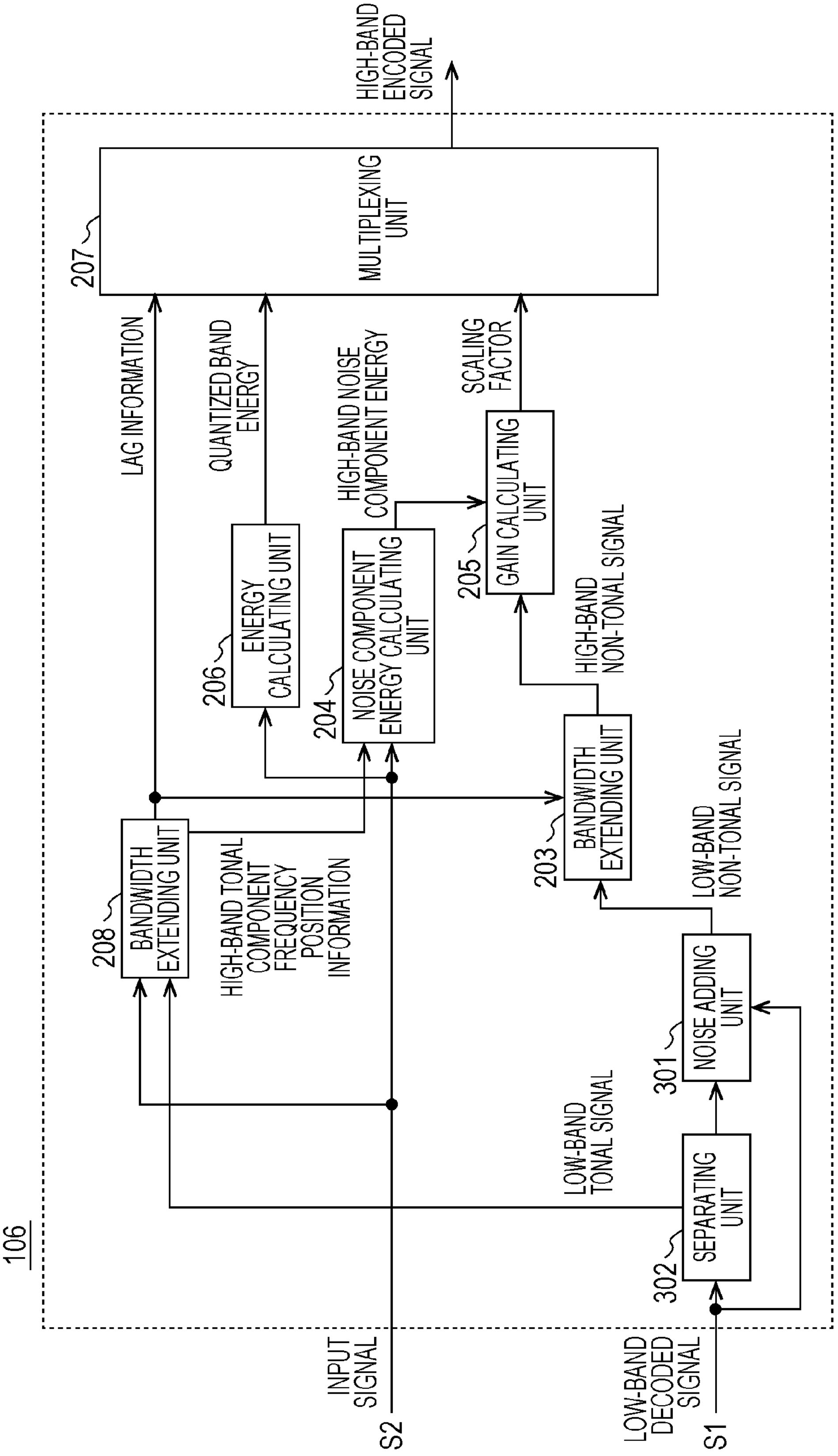
FIG. 3 illustrates a configuration of a second layer encoding unit in an encoding device according to a second embodiment of the present disclosure.

FIG. 3 is a block diagram illustrating a configuration of a second layer encoding unit 106 in this embodiment, differing from the second layer encoding unit 106 in the first embodiment in that the position relationship of the noise adding unit and the separating unit is inverted and that a separating unit 302 and a noise adding unit 301 are included.

From a low-band decoded signal S1, the separating unit 302 separates a low-band non-tonal signal, which is a non-tonal component, and a low-band tonal signal, which is a tonal component. The separation method used is the same as that in the description of the first embodiment, and the separation is performed according to the degree of amplitude on the basis of a predetermined threshold. The threshold may be set to zero.

The noise adding unit 301 adds a noise signal to the low-band non-tonal signal output from the separating unit 302. In order not to add a noise signal to a component that already has an amplitude, the low-band decoded signal S1 may be referred to.

Figure 4:
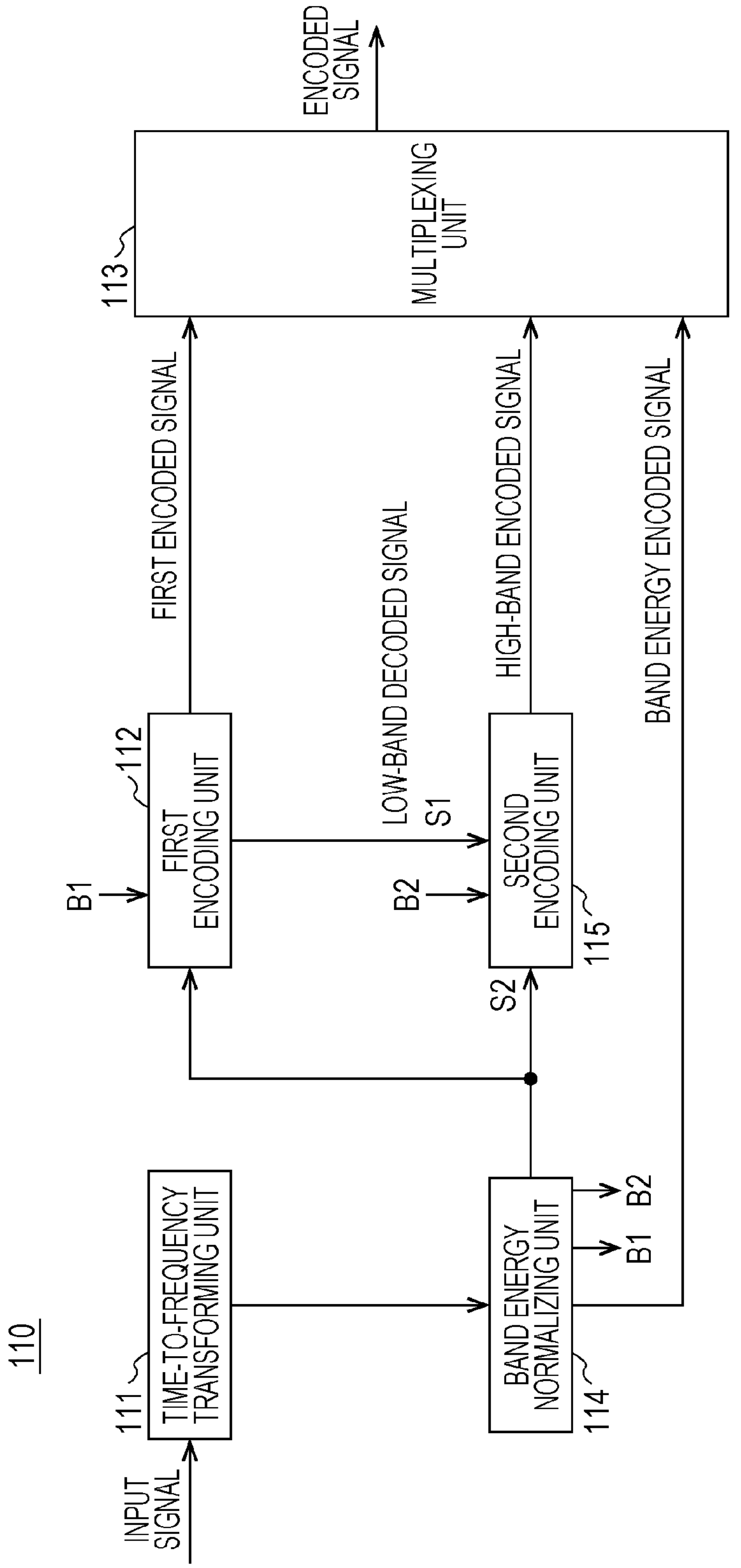
FIG. 4 illustrates an overall configuration of another encoding device according to the first and the second embodiment of the present disclosure.
Figure 9:
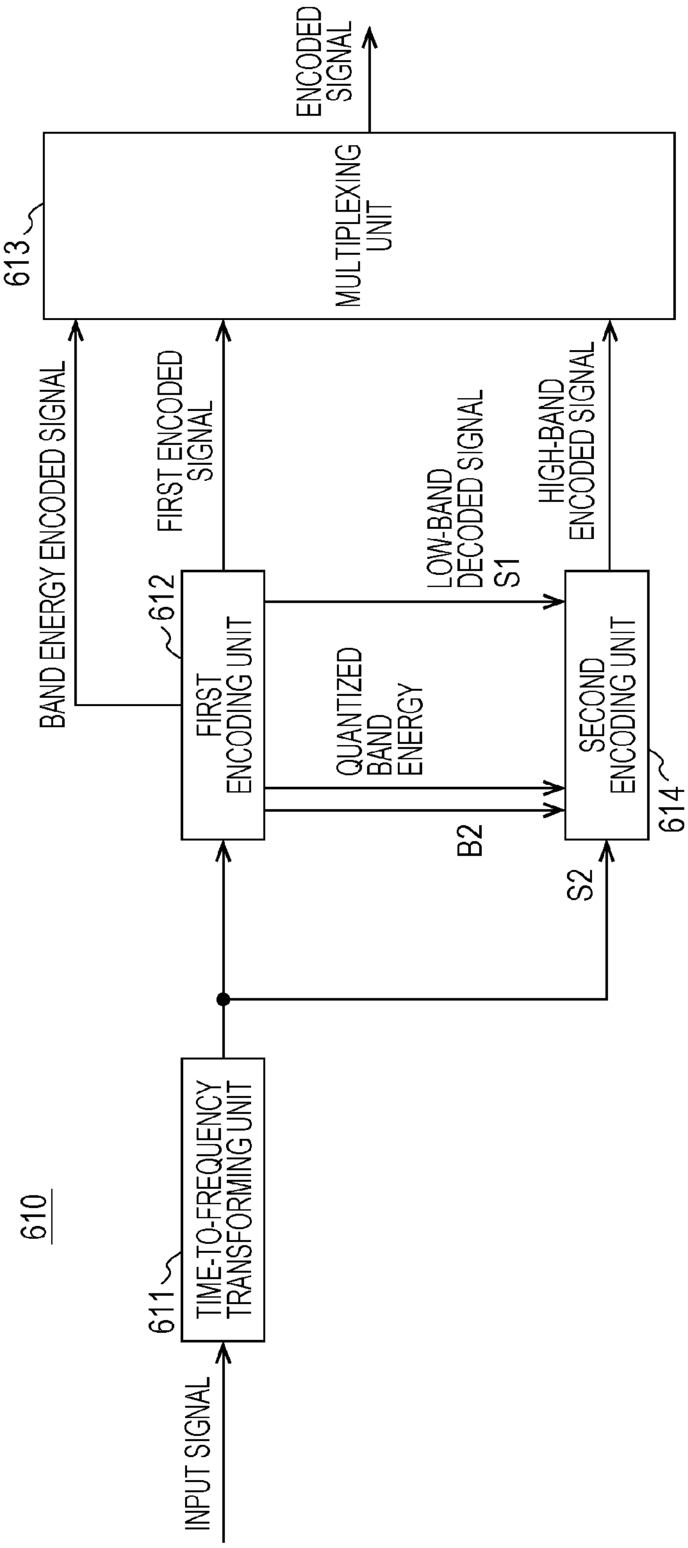
FIG. 9 illustrates an overall configuration of another encoding device according to the first and the second embodiment of the present disclosure.

Note that examples of employing scalable encoding have been described in the first and second embodiments. However, the first and second embodiments can be applied to cases where encoding other than scalable encoding is employed. FIGS. 4 and 9 are examples of other encoding devices, encoding devices 110 and 610, respectively. First, the encoding device 110 illustrated in FIG. 4 will be described.

The encoding device 110 illustrated in FIG. 4 includes a time-to-frequency transforming unit 111, a first encoding unit 112, a multiplexing unit 113, a band energy normalizing unit 114, and a second encoding unit 115.

The time-to-frequency transforming unit 111 performs frequency transformation on an input signal by MDCT or the like.

For every predetermined band, the band energy normalizing unit 114 calculates, quantizes, and encodes the band energy of an input spectrum, which is the input signal subjected to frequency transformation, and outputs the resulting band energy encoded signal to the multiplexing unit 113. In addition, the band energy normalizing unit 114 calculates bit allocation information B1 and B2 regarding the bits to be allocated to the first encoded signal and the second encoded signal, respectively, by using the quantized band energy, and outputs the bit allocation information B1 and B2 to the first encoding unit 112 and the second encoding unit 115, respectively. In addition, the band energy normalizing unit 114 further normalizes the input spectrum in each band by using the quantized band energy, and outputs a normalized input spectrum S2 to the first encoding unit 112 and the second encoding unit 115.

The first encoding unit 112 performs first encoding on the normalized input spectrum S2 including a low-band signal having a frequency lower than or equal to a predetermined frequency on the basis of the bit allocation information B1 that has been input. Then, the first encoding unit 112 outputs, to the multiplexing unit 113, a first encoded signal generated as a result of the encoding. In addition, the first encoding unit 112 outputs, to the second encoding unit 115, a low-band decoded signal S1 obtained in the process of the encoding.

The second encoding unit 115 performs second encoding on a part of the normalized input spectrum S2 where the first encoding unit 112 has failed to encode. The second encoding unit 115 can have the configuration of the second layer encoding unit 106 described with reference to FIGS. 2 and 3.

Next, the encoding device 610 illustrated in FIG. 9 will be described. The encoding device 610 illustrated in FIG. 9 includes a time-to-frequency transforming unit 611, a first encoding unit 612, a multiplexing unit 613, and a second encoding unit 614.

The time-to-frequency transforming unit 611 performs frequency transformation on an input signal by MDCT or the like.

For every predetermined band, the first encoding unit 612 calculates, quantizes, and encodes the band energy of an input spectrum, which is the input signal subjected to frequency transformation, and outputs the resulting band energy encoded signal to the multiplexing unit 613. In addition, the first encoding unit 612 calculates bit allocation information to be allocated to a first encoded signal and a second encoded signal by using the quantized band energy, and performs, on the basis of a bit allocation information, first encoding on a normalized input spectrum S2 including a low-band signal having a frequency lower than or equal to a predetermined frequency. Then, the first encoding unit 612 outputs a first encoded signal to the multiplexing unit 613 and outputs, to the second encoding unit 614, a low-band decoded signal S1, which is a low-band component of a decoded signal of the first encoded signal. The first encoding here may be performed on the input signal that has been normalized by quantized band energy. In this case, the decoded signal of the first encoded signal corresponds to a signal obtained by inverse-normalization by the quantized band energy. In addition, the first encoding unit 612 outputs a bit allocation information B2 to be allocated to the second encoded signal and high-band quantized band energy to the second encoding unit 614.

The second encoding unit 614 performs second encoding on a part of the normalized input spectrum S2 where the first encoding unit 612 has failed to encode. The second encoding unit 614 can have the configuration of the second layer encoding unit 106 described with reference to FIGS. 2 and 3. Note that, although not illustrated clearly in FIG. 2 or 3, the bit allocation information are input to the bandwidth extending unit 208 that encodes the lag information and the gain calculating unit 205 that encodes the scaling factor. In addition, the energy calculating unit 206 calculates and quantizes band energy by using the input signal in FIGS. 2 and 3, but is unnecessary in FIG. 9 because the first encoding unit 612 performs this process.

Figure 5:
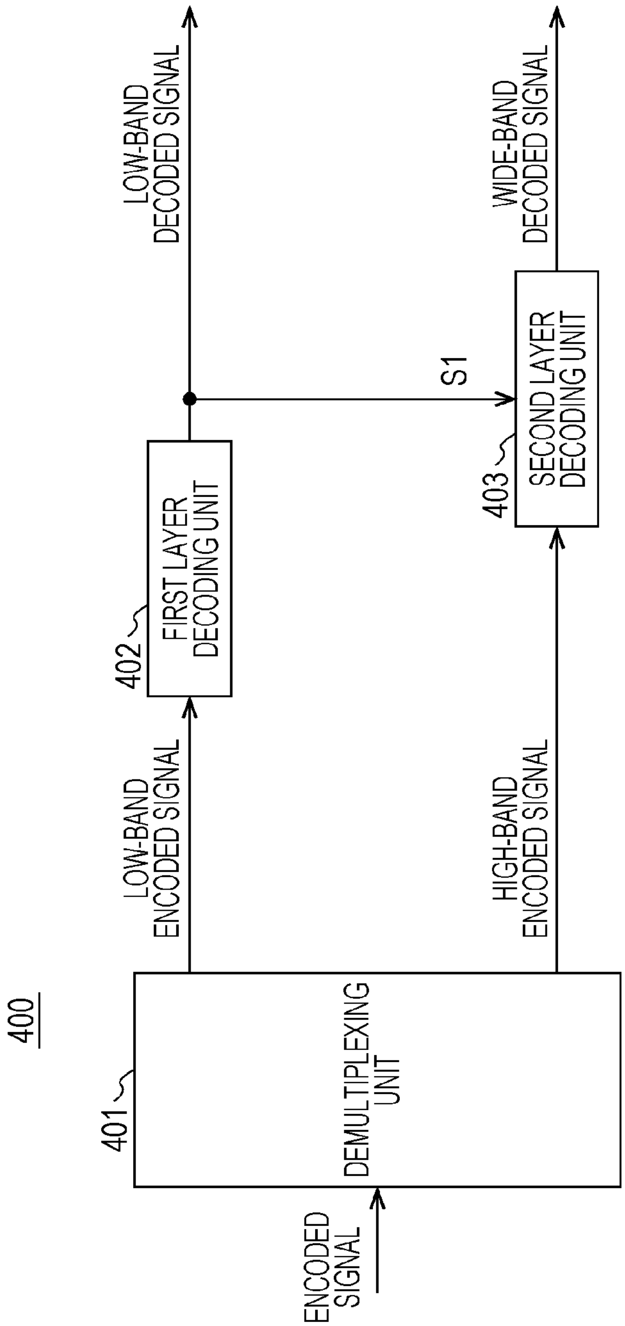
FIG. 5 illustrates an overall configuration of a decoding device according to the present disclosure.

FIG. 5 is a block diagram illustrating a configuration of a voice signal decoding device according to a third embodiment. As an example, in the following description, an encoded signal is a signal that has a layered configuration including a plurality of layers and that is transmitted from an encoding device, and the decoding device decodes this encoded signal. Note that an example in which an encoded signal does not have a layered configuration will be described with reference to FIG. 8.

A decoder 400 illustrated in FIG. 5 includes a demultiplexing unit 401, a first layer decoding unit 402, and a second layer decoding unit 403. An antenna, which is not illustrated, is connected to the demultiplexing unit 401.

From an encoded signal input through the antenna, which is not illustrated, the demultiplexing unit 401 demultiplexes a low-band encoded signal, which is a first encoded signal, and a high-band encoded signal. The demultiplexing unit 401 outputs the low-band encoded signal to the first layer decoding unit 402 and outputs the high-band encoded signal to the second layer decoding unit 403.

The first layer decoding unit 402, which is an embodiment of a first decoding unit, decodes the low-band encoded signal, thereby generating a low-band decoded signal S1. Examples of the decoding by the first layer decoding unit 402 include CELP decoding. The first layer decoding unit 402 outputs the low-band decoded signal S1 to the second layer decoding unit 403.

The second layer decoding unit 403, which is an embodiment of a second decoding unit, decodes the high-band encoded signal, thereby generating a wide-band decoded signal by using the low-band decoded signal S1, and outputs the wide-band decoded signal. Details of the second layer decoding unit 403 will be described later.

Then, the low-band decoded signal S1 and/or the wide-band decoded signal are reproduced through an amplifier and a speaker, which are not illustrated.

Figure 6:
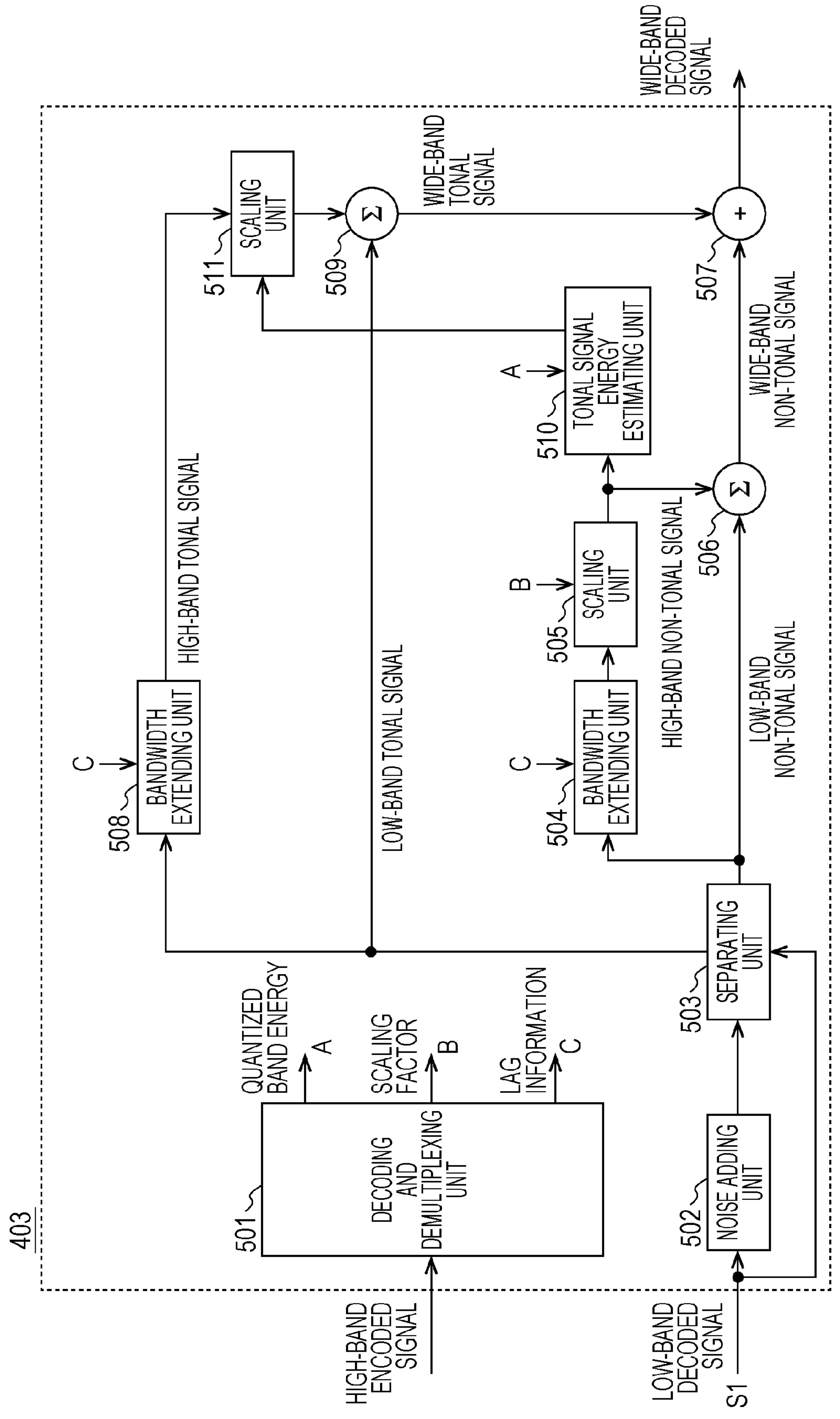
FIG. 6 illustrates a configuration of a second layer decoding unit in a decoding device according to a third embodiment of the present disclosure.

FIG. 6 is a block diagram illustrating a configuration of the second layer decoding unit 403 in this embodiment. The second layer decoding unit 403 includes a decoding and demultiplexing unit 501, a noise adding unit 502, a separating unit 503, a bandwidth extending unit 504, a scaling unit 505, a coupling unit 506, an adding unit 507, a bandwidth extending unit 508, a coupling unit 509, a tonal signal energy estimating unit 510, and a scaling unit 511.

The decoding and demultiplexing unit 501 decodes the high-band encoded signal and demultiplexes quantized band energy A, a scaling factor B, and lag information C. Note that the demultiplexing unit 401 and the decoding and demultiplexing unit 501 may be provided separately or integrally.

The noise adding unit 502 adds a noise signal to the low-band decoded signal S1 input from the first layer decoding unit 402. The noise signal used is the same as the noise signal that is added by the noise adding unit 201 in the encoding device 100. Then, the noise adding unit 502 outputs, to the separating unit 503, the low-band decoded signal to which the noise signal has been added.

From the low-band decoded signal, to which the noise signal has been added, the separating unit 503 separates a non-tonal component and a tonal component, and outputs the non-tonal component and the tonal component as a low-band non-tonal signal and a low-band tonal signal, respectively. The method for separating the low-band non-tonal signal and the low-band tonal signal is the same as that described for the separating unit 202 in the encoding device 100.

By using the lag information C, the bandwidth extending unit 504 copies the low-band non-tonal signal having a specific band to a high band, thereby generating a high-band non-tonal signal.

The scaling unit 505 multiplies the high-band non-tonal signal generated by the bandwidth extending unit 504 by the scaling factor B, thereby adjusting the amplitude of the high-band non-tonal signal.

Then, the coupling unit 506 couples the low-band non-tonal signal and the high-band non-tonal signal whose amplitude has been adjusted by the scaling unit 505, thereby generating a wide-band non-tonal signal.

On the other hand, the low-band tonal signal separated by the separating unit 503 is input to the bandwidth extending unit 508. Then, in the same manner as the bandwidth extending unit 504, by using the lag information C, the bandwidth extending unit 508 copies the low-band tonal signal having a specific band to a high band, thereby generating a high-band tonal signal.

The tonal signal energy estimating unit 510 calculates the energy of the high-band non-tonal signal that has been input from the scaling unit 505 and that has the adjusted amplitude, and subtracts the energy of the high-band non-tonal signal from the value of the quantized band energy A, thereby obtaining the energy of the high-band tonal signal. Then, the tonal signal energy estimating unit 510 outputs the ratio between the energy of the high-band non-tonal signal and the energy of the high-band tonal signal to the scaling unit 511.

The scaling unit 511 multiplies the high-band tonal signal by the ratio between the energy of the high-band non-tonal signal and the energy of the high-band tonal signal, thereby adjusting the amplitude of the high-band tonal signal.

Then, the coupling unit 509 couples the low-band tonal signal and the high-band tonal signal having the adjusted amplitude, thereby generating a wide-band tonal signal.

Lastly, the adding unit 507 adds the wide-band non-tonal signal and the wide-band tonal signal, thereby generating a wide-band decoded signal, and outputs the wide-band decoded signal.

In the above manner, this embodiment has a configuration in which the non-tonal component is generated by using the low-band quantized spectrum and a small number of bits and is adjusted to have appropriate energy by using the scaling factor, and in which the energy of the high-band tonal signal is adjusted by using the energy of the adjusted non-tonal component. Accordingly, it is possible to encode, transmit, and decode a music signal and the like with a small amount of information and to appropriately reproduce the energy of a high-band non-tonal component. It is also possible to reproduce the energy of appropriate tonal component by determining the energy of the tonal component by using the quantized band energy information and the non-tonal component energy information.

Next, a configuration of a decoding device according to a fourth embodiment of the present disclosure will be described with reference to FIG. 7. Note that the overall configuration of a decoder 400 according to this embodiment includes the configuration illustrated in FIG. 4 as in the first embodiment.

Figure 7:
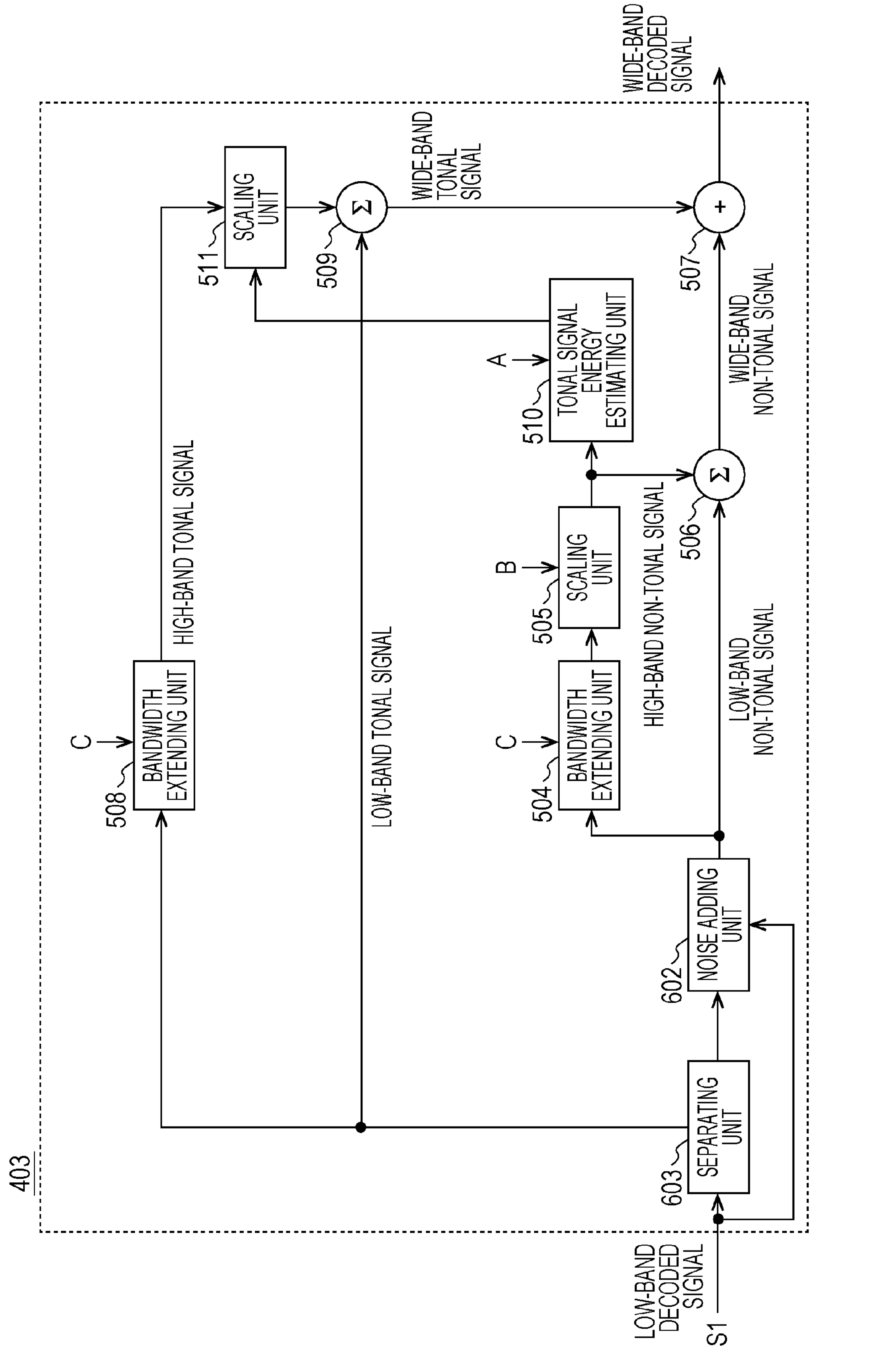
FIG. 7 illustrates a configuration of a second layer decoding unit in a decoding device according to a fourth embodiment of the present disclosure.

FIG. 7 is a block diagram illustrating a configuration of a second layer decoding unit 403 in this embodiment, differing from the second layer decoding unit 403 in the third embodiment in that the position relationship of the noise adding unit and the separating unit is inverted and a separating unit 603 and a noise adding unit 602 are included, as in the relationship between the first embodiment and the second embodiment. Note that the decoding and demultiplexing unit 501 is omitted from illustration in FIG. 7.

From a low-band decoded signal, the separating unit 603 separates a low-band non-tonal signal, which is a non-tonal component, and a low-band tonal signal, which is a tonal component.

The noise adding unit 602 adds a noise signal to the low-band non-tonal signal output from the separating unit 603.

Figure 8:
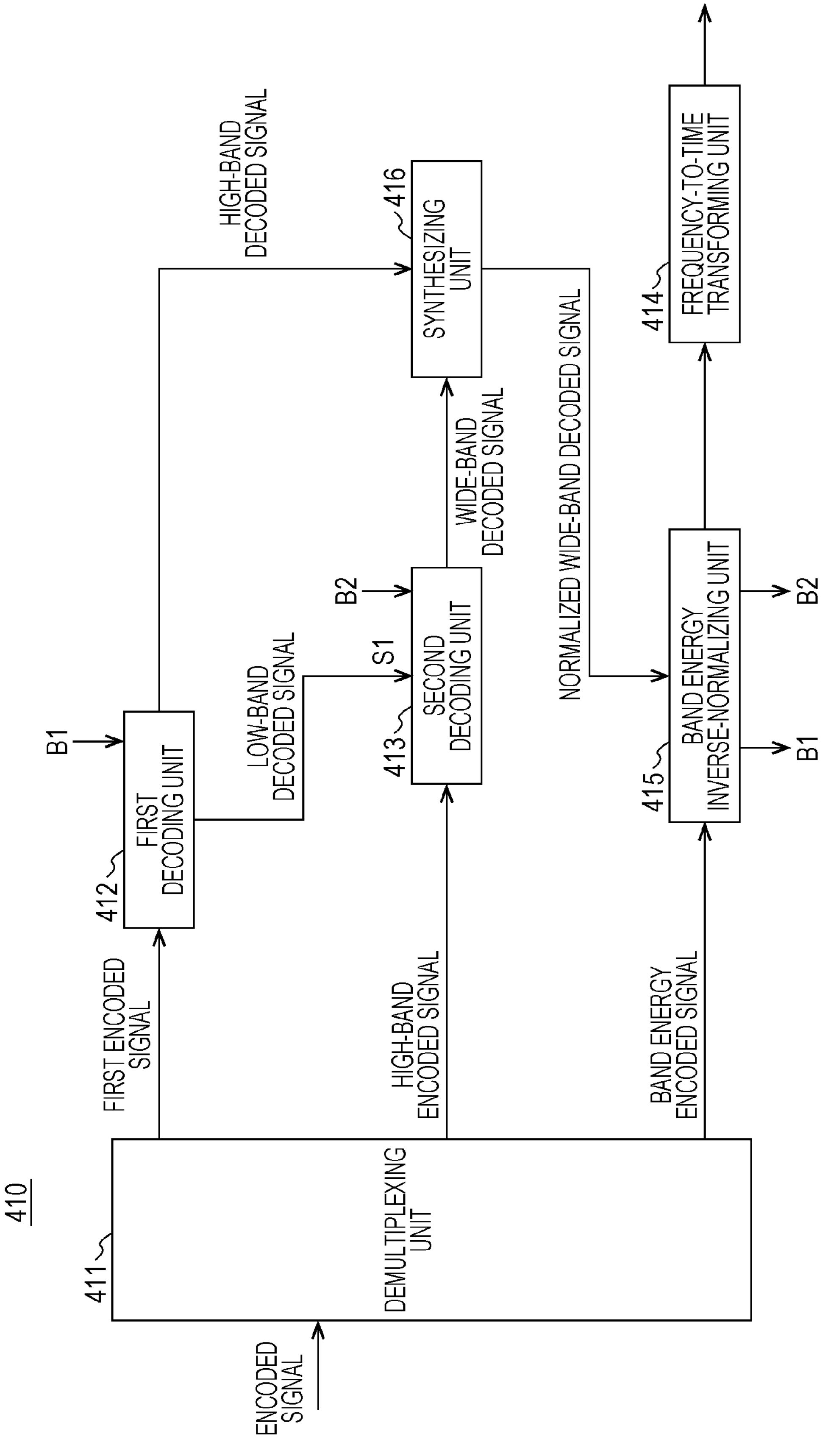
FIG. 8 illustrates an overall configuration of another decoding device according to the third and the fourth embodiment of the present disclosure.
Figure 10:
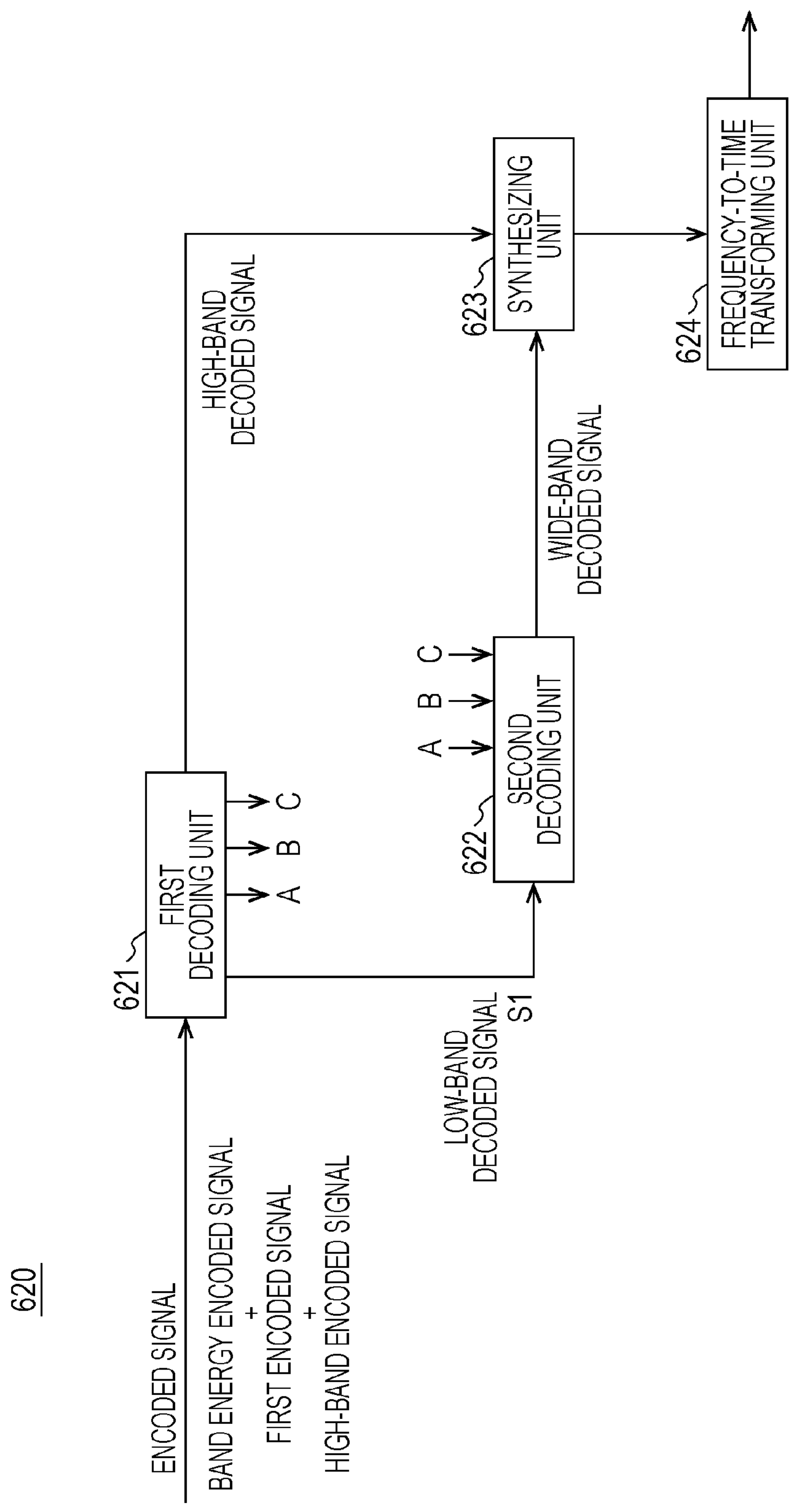
FIG. 10 illustrates an overall configuration of another decoding device according to the third and the fourth embodiment of the present disclosure.

Note that an example of employing scalable encoding has been described in the third and fourth embodiments. However, the third and fourth embodiments can be applied to cases where encoding other than scalable encoding is employed. FIGS. 8 and 10 illustrate examples of other decoding devices, decoding devices 410 and 620, respectively. First, the decoding device 410 illustrated in FIG. 8 will be described.

The decoding device 410 illustrated in FIG. 8 includes a demultiplexing unit 411, a first decoding unit 412, a second decoding unit 413, a frequency-to-time transforming unit 414, a band energy inverse-normalizing unit 416, and a synthesizing unit 116.

From an encoded signal input through an antenna, which is not illustrated, the demultiplexing unit 411 demultiplexes a first encoded signal, a high-band encoded signal, and a band energy encoded signal. The demultiplexing unit 411 outputs the first encoded signal, the high-band encoded signal, and the band energy encoded signal to the first decoding unit 412, the second decoding unit 413, and the band energy inverse-normalizing unit 415, respectively.

The band energy inverse-normalizing unit 415 decodes the band energy encoded signal, thereby generating quantized band energy. On the basis of the quantized band energy, the band energy inverse-normalizing unit 415 calculates bit allocation information B1 and B2 and outputs the bit allocation information B1 and B2 to the first decoding unit 412 and the second decoding unit 413, respectively. In addition, the band energy inverse-normalizing unit 415 performs inverse-normalization in which the generated quantized band energy is multiplied by a normalized wide-band decoded signal input from the synthesizing unit 416, thereby generating a final wide-band decoded signal, and outputs the wide-band decoded signal to the frequency-to-time transforming unit 414.

The first decoding unit 412 decodes the first encoded signal in accordance with the bit allocation information B1, thereby generating a low-band decoded signal S1 and a high-band decoded signal. The first decoding unit 412 outputs the low-band decoded signal and the high-band decoded signal to the second decoding unit 413 and the synthesizing unit 416, respectively.

The second decoding unit 413 decodes the high-band encoded signal in accordance with the bit allocation information B2, thereby generating a wide-band decoded signal by using the low-band decoded signal, and outputs the wide-band decoded signal. The second decoding unit 413 can have the same configuration as the second layer decoding unit 403 described with reference to FIGS. 6 and 7.

The synthesizing unit 416 adds the high-band decoded signal decoded by the first decoding unit 412 to the wide-band decoded signal input from the second decoding unit 413, thereby generating the normalized wide-band decoded signal, and outputs the wide-band decoded signal to the band energy inverse-normalizing unit 415.

Then, the wide-band decoded signal output from the band energy inverse-normalizing unit 415 is transformed into a time-domain signal by the frequency-to-time transforming unit 414 and reproduced through an amplifier and a speaker, which are not illustrated.

Next, the decoding device 620 illustrated in FIG. 10 will be described. FIG. 10 is an example of another decoding device, the decoding device 620. The decoding device 620 illustrated in FIG. 10 includes a first decoding unit 621, a second decoding unit 622, a synthesizing unit 623, and a frequency-to-time transforming unit 624.

An encoded signal (including a first encoded signal, a high-band encoded signal, and a band energy encoded signal) input through an antenna, which is not illustrated, is input to the first decoding unit 621. First, the first decoding unit 621 demultiplexes and decodes band energy, and outputs a high-band part of the decoded band energy to the second decoding unit 622 as high-band band energy (A). Then, on the basis of the decoded band energy, the first decoding unit 621 calculates bit allocation information and demultiplexes and decodes the first encoded signal. This decoding process may include an inverse-normalizing process using the decoded band energy. The first decoding unit 621 outputs, to the second decoding unit 622, a low-band part of a first decoded signal obtained by the decoding as a low-band decoded signal S1. Then, the first decoding unit 621 separates and decodes the high-band encoded signal on the basis of the bit allocation information. A high-band decoded signal obtained by the decoding includes a scaling factor (B) and lag information (C), and the scaling factor and the lag information are output to the second decoding unit 622. The first decoding unit 621 also outputs a high-band part of the first decoded signal to the synthesizing unit 623 as a high-band decoded signal. The high-band decoded signal may be zero in some cases.

The second decoding unit 622 generates a wide-band decoded signal by using the low-band decoded signal S1, the decoded quantized band energy, the scaling factor, and the lag information input from the first decoding unit 621, and outputs the wide-band decoded signal. The second decoding unit 622 may have the same configuration as the second layer decoding unit 403 described with reference to FIGS. 6 and 7.

The synthesizing unit 623 adds the high-band decoded signal decoded by the first decoding unit 621 to the wide-band decoded signal input from the second decoding unit 622, thereby generating a wide-band decoded signal. The resulting signal is transformed into a time-domain signal by the frequency-to-time transforming unit 624 and reproduced through an amplifier and a speaker, which are not illustrated.

The above first to fourth embodiments have described the encoding devices and decoding devices according to the present disclosure. The encoding devices and the decoding devices according to the present disclosure are ideas including a half-completed-product-level form or a component-level form, typically a system board or a semiconductor element, and including a completed-product-level form, such as a terminal device or a base station device. In the case where each of the encoding devices and decoding devices according to the present disclosure is in a half-completed-product-level form or a component-level form, the completed-product-level form is realized by combination with an antenna, a DA/AD (digital-to-analog/analog-to-digital) converter, an amplifier, a speaker, a microphone, or the like.

Note that the block diagrams in FIGS. 1 to 10 illustrate dedicated-design hardware configurations and operations (methods) and also include cases where hardware configurations and operations are realized by installing programs that execute the operations (methods) according to the present disclosure in general-purpose hardware and executing the programs by a processor. Examples of an electronic calculator serving as such general-purpose hardware include personal computers, various mobile information terminals including smartphones, and cell phones.

In addition, the dedicated-design hardware is not limited to a completed-product level (consumer electronics), such as a cell phone or a landline phone, and includes a half-completed-product level or a component level, such as a system board or a semiconductor element.

An example where the present disclosure is used in a base station can be the case where transcoding for changing a voice encoding scheme is performed at the base station. Note that the base station is an idea including various nodes existing in a communication line.

The encoding devices and decoding devices according to the present disclosure are applicable to devices relating to recording, transmission, and reproduction of voice signals and audio signals.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An encoding device comprising:

a first encoder, which in operation, encodes a low-band signal from a voice or audio input signal to generate a first encoded signal;

a decoder, which in operation, decodes the first encoded signal to generate a low-band decoded signal;

a second encoder, which in operation, encodes, on the basis of the low-band decoded signal, a high-band signal comprising a band from the voice or audio input signal, the band being higher than that of the low-band signal to generate a high-band encoded signal;

an energy calculator, which in operation, calculates an energy of the voice or audio input signal for each subband of a plurality of subbands of the voice or audio input signal to acquire a calculated energy for each subband of the plurality of subbands of the voice or audio input signal, quantizes the calculated energy for each subband of the plurality of subbands of the voice or audio input signal to acquire a quantized band energy for each subband of the plurality of subbands of the voice or audio input signal and outputs the quantized band energy for each subband of the plurality of subbands of the voice or audio input signal; and a multiplexer, which in operation, multiplexes the quantized band energy for each subband of the plurality of subbands of the voice or audio input signal, the first encoded signal, and the high-band encoded signal to generate and output an encoded signal.

2. The encoding device of claim 1, wherein the second encoder comprises at least one of the following:

a bandwidth extending unit that outputs, as lag information, position information regarding a specific band in which a correlation between the high-band signal and a low-band tonal signal derived from the low-band decoded signal becomes maximum, the lag information being comprised by the high-band encoded signal, a calculating unit that calculates an energy ratio between a high-band noise component and the high-band non-tonal signal acquired by the second bandwidth extending unit, and outputs the calculated ratio as a scaling factor, and a second multiplexer that multiplexes the lag information and the scaling factor as the high-band encoded signal and outputs the high-band encoded signal.

3. The encoding device of claim 1, wherein the second encoder comprises:

a separating unit that separates, from the low-band decoded signal, the low-band non-tonal signal, which is a non-tonal component of the low-band decoded signal, and a low-band tonal signal, which is a tonal component of the low-band decoded signal; and a noise adding unit that adds a noise signal to the low-band decoded signal before a separation operation of the separating unit, or to the low-band non-tonal signal output from the separating unit.

4. The encoding device of claim 1, wherein the second encoder comprises:

a bandwidth extending unit being configured to output, as a high-band non-tonal signal, a low-band non-tonal signal corresponding to a lag information, on the basis of the position information regarding the specific band; and a calculating unit that calculates an energy ratio between a high-band noise component and the high-band non-tonal signal, and outputs the calculated ratio as a scaling factor, the scaling factor being comprised by the in the high-band encoded signal.

5. The encoding device of claim 4, wherein the second encoder comprises a noise component energy calculating unit for calculating an energy of the high-band noise component using the position information, wherein the noise component energy calculating unit is configured for subtracting an energy of components of spectral bins at high-band tonal-component frequency positions indicated by the position information from an energy of the components in the high-band signal.

6. The encoding device of claim 1, wherein the second encoder is configured to calculate an energy ratio between a high-band noise component, which is a noise component of the high-band signal from the voice or audio input signal, and a high-band non-tonal component of a high-band decoded signal generated from the low-band decoded signal, wherein the high-band encoded signal comprises information on the calculated energy ratio.

7. The encoding device of claim 6, wherein the high-band non-tonal component of the high-band decoded signal is a component of the high-band decoded signal having an amplitude less than or equal to a predetermined threshold or a component of the high-band decoded signal that has become zero by not having been quantized by a pulse quantizer.

8. A decoding device that receives a first encoded signal, a high-band encoded signal comprising lag information, and a band energy encoded signal representing a quantized band energy for each subband of a plurality of subbands, the decoding device comprising:

a first decoder, which in operation, decodes the first encoded signal to generate a low-band decoded signal;

a second decoder, which in operation, decodes the high-band encoded signal to generate a wide-band decoded signal by using the low-band decoded signal and the band energy encoded signal representing a quantized band energy for each subband of a plurality of subbands; and a third decoder, which in operation, decodes the band energy encoded signal to generate a quantized band energy for each subband of the plurality of subbands.

9. The decoding device of claim 8, wherein the second decoder comprises:

a separating unit that separates, from the low-band decoded signal, a low-band non-tonal signal, which is a non-tonal component of the low-band decoded signal, and a low-band tonal signal, which is a tonal component of the low-band decoded signal; and a noise adding unit that adds a noise signal to the low-band decoded signal before a separation operation of the separating unit or to the low-band non-tonal signal output from the separating unit.

10. The decoding device of claim 8, wherein the second decoder comprises:

a scaling unit that adjusts an amplitude of a high-band non-tonal signal by using a scaling factor acquired by decoding the high-band encoded signal to acquire an adjusted amplitude, wherein a tonal signal energy estimating unit is configured to estimate an energy of a high-band tonal signal from an energy of the high-band non-tonal signal comprising an adjusted amplitude and the quantized band energy for a subband of the plurality of subbands.

11. The decoding device of claim 8, wherein an addition unit is configured to add a wide-band non-tonal signal and a wide-band tonal signal to generate the wide-band decoded signal, wherein the wide-band non-tonal signal is acquired by coupling the low-band non-tonal signal and a high-band non-tonal signal, and wherein the wide-band tonal signal is acquired by coupling a low-band tonal signal and a high-band tonal signal.

12. The decoding device of claim 8, wherein the second decoder comprises:

a scaling unit that adjusts an amplitude of a high-band tonal signal on the basis of an energy of the high-band tonal signal, and wherein an addition unit is configured to use the high-band tonal signal comprising an adjusted amplitude to generate a wide-band tonal signal.

13. The decoding device of claim 8, wherein the second decoder comprises:

a bandwidth extending unit that copies a low-band non-tonal signal derived from the low-band decoded signal to a high band by using the lag information acquired by decoding the high-band encoded signal to acquire a high-band non-tonal signal;

a tonal signal energy estimating unit that estimates an energy of a high-band tonal signal from an energy of the high-band non-tonal signal and the quantized band energy for a subband of the plurality of subbands; and an addition unit that adds the low-band non-tonal signal, the high-band non-tonal signal, a low-band tonal signal derived from the low-band decoded signal, and a high-band tonal signal derived from the low-band decoded signal and the lag information to generate a wide-band decoded signal.

14. The decoding device of claim 8, wherein the high-band encoded signal includes information on an energy ratio between a high-band noise component of the high-band signal from a voice or audio signal, and a high-band non-tonal signal, which is a non-tonal component of a high-band decoded signal generated from the low-band decoded signal.

15. The decoding device of claim 14, wherein the non-tonal component of the high-band decoded signal is a component of the high-band decoded signal having an amplitude less than or equal to a predetermined threshold or a component of the high-band decoded signal that has become zero by not having been quantized by a pulse quantization.

16. The decoding device of claim 14, wherein the second decoder is configured to adjust an amplitude of a low-band non-tonal signal, which is a non-tonal component of the low-band decoded signal or to adjust an amplitude of the high-band non-tonal signal, by referring to the information on the energy ratio included in the high-band encoded signal.

17. The decoding device of claim 16, wherein the non-tonal component of the low-band decoded signal is a component of the low-band decoded signal having an amplitude less than or equal to a predetermined threshold or a component of the low-band decoded signal that has become zero by not having been quantized by pulse quantization.

18. An encoding method comprising:

encoding a low-band signal from a voice or audio input signal to generate a first encoded signal;

decoding the first encoded signal to generate a low-band decoded signal;

encoding, on the basis of the low-band decoded signal, a high-band signal comprising a band higher than that of the low-band signal to generate a high-band encoded signal;

calculating an energy of the voice or audio input signal for each subband of a plurality of subbands of the voice or audio input signal to acquire a calculated energy for each subband of the plurality of subbands of the voice or audio input signal, quantizing the calculated energy for each subband of the plurality of subbands of the voice or audio input signal to acquire a quantized band energy for each subband of the plurality of subbands of the voice or audio input signal, and outputting the quantized band energy for each subband of the plurality of subbands of the voice or audio input signal; and multiplexing the quantized band energy for each subband of the plurality of subbands of the voice or audio input signal, the first encoded signal and the high-band encoded signal to generate and output an encoded signal.

19. A decoding method for a first encoded signal, a high-band encoded signal comprising lag information, and a band energy encoded signal representing a quantized band energy for each subband of a plurality of subbands, the method comprising:

decoding the first encoded signal to generate a low-band decoded signal;

decoding the high-band encoded signal to generate a wide-band decoded signal by using the low-band decoded signal and the band energy encoded signal representing a quantized band energy for each subband of a plurality of subbands; and decoding the band energy encoded signal to generate a quantized band energy for each subband of the plurality of subbands.

20. A non-transitory digital storage medium having a computer program stored thereon to perform the encoding method comprising:

encoding a low-band signal from a voice or audio input signal to generate a first encoded signal;

decoding the first encoded signal to generate a low-band decoded signal;

encoding, on the basis of the low-band decoded signal, a high-band signal comprising a band higher than that of the low-band signal to generate a high-band encoded signal;

calculating an energy of the voice or audio input signal for each subband of a plurality of subbands of the voice or audio input signal to acquire a calculated energy for each subband of the plurality of subbands of the voice or audio input signal, quantizing the calculated energy for each subband of the plurality of subbands of the voice or audio input signal to acquire a quantized band energy for each subband of the plurality of subbands of the voice or audio input signal, and outputting the quantized band energy for each subband of the plurality of subbands of the voice or audio input signal; and multiplexing the quantized band energy for each subband of the plurality of subbands of the voice or audio input signal, the first encoded signal and the high-band encoded signal to generate and output an encoded signal, when said computer program is run by a computer.

21. A non-transitory digital storage medium having a computer program stored thereon to perform the decoding method for a first encoded signal, a high-band encoded signal comprising lag information, and a band energy encoded signal representing a quantized band energy for each subband of a plurality of subbands, the method comprising:

decoding the first encoded signal to generate a low-band decoded signal;

decoding the high-band encoded signal to generate a wide-band decoded signal by using the low-band decoded signal and the band energy encoded signal representing a quantized band energy for each subband of a plurality of subbands; and decoding the band energy encoded signal to generate a quantized band energy for each subband of the plurality of subbands, when said computer program is run by a computer.

* * * * *